US012600454B2

(12) United States Patent
Kupratis et al.

(10) Patent No.: US 12,600,454 B2
(45) Date of Patent: Apr. 14, 2026

(54) INLET VANE FORWARD OF AIRCRAFT PROPULSION SYSTEM AIRFLOW INLET

(71) Applicant: RTX Corporation, Farmington, CT (US)

(72) Inventors: Daniel B. Kupratis, Wallingford, CT (US); Paul R. Hanrahan, Sedona, AZ (US); Benjamin T. Mylrea, Jupiter, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/827,084

(22) Filed: Sep. 6, 2024

(65) Prior Publication Data

US 2026/0070647 A1 Mar. 12, 2026

(51) Int. Cl.
| | |
|---|---|
| *B64C 39/10* | (2006.01) |
| *B64C 1/06* | (2006.01) |
| *B64C 11/00* | (2006.01) |

(52) U.S. Cl.
CPC ............ *B64C 1/068* (2013.01); *B64C 11/001* (2013.01); *B64C 2039/105* (2013.01)

(58) Field of Classification Search
CPC .......... B64C 21/06; B64C 5/06; B64C 39/00; B64C 39/10; B64C 2039/105
See application file for complete search history.

(56) References Cited

U.S. PATENT DOCUMENTS

| | | | | |
|---|---|---|---|---|
| 9,505,484 | B1 * | 11/2016 | Al-Sabah | .................. B64C 3/38 |
| 10,252,790 | B2 | 4/2019 | Ramakrishnan | |
| 11,124,291 | B2 | 9/2021 | Terwilliger | |
| 11,204,000 | B2 | 12/2021 | O'Brien | |
| 2008/0099632 | A1 | 5/2008 | Addis | |
| 2015/0240745 | A1 | 8/2015 | Lord | |
| 2020/0156787 | A1 | 5/2020 | Dizdarevic | |
| 2024/0253763 | A1 * | 8/2024 | Vassberg | ................ B64D 33/02 |

FOREIGN PATENT DOCUMENTS

| | | |
|---|---|---|
| CN | 113071689 A | 7/2021 |
| CN | 216509107 U | 5/2022 |

OTHER PUBLICATIONS

EP Search Report for EP Patent Application No. 25200868.5 dated Jan. 22, 2026.

* cited by examiner

*Primary Examiner* — Timothy D Collins
*Assistant Examiner* — Justin Michael Heston
(74) *Attorney, Agent, or Firm* — Getz Balich LLC

(57) ABSTRACT

An assembly is provided for an aircraft. This aircraft assembly includes an airframe structure, a propulsion system and a vane. The airframe structure includes a fuselage and at least two wings. The fuselage extends longitudinally along a longitudinal centerline from a forward end of the fuselage to an aft end of the fuselage. The wings extend laterally from opposing sides of the fuselage. The propulsion system is mounted to the airframe structure. The propulsion system includes an airflow inlet into the propulsion system. The airflow inlet is spaced vertically out from a top side of the airframe structure. The vane projects vertically out from the top side of the airframe structure to a distal end of the vane. The vane laterally overlaps and is longitudinally forward of the airflow inlet.

16 Claims, 13 Drawing Sheets

INLET VANE FORWARD OF AIRCRAFT PROPULSION SYSTEM AIRFLOW INLET

BACKGROUND OF THE DISCLOSURE

1. Technical Field

This disclosure relates generally to an aircraft and, more particularly, to a propulsion system arrangement for the aircraft.

2. Background Information

Various propulsion system arrangements for an aircraft are known in the art. While these known propulsion system arrangements have various benefits, there is still room in the art for improvement.

SUMMARY OF THE DISCLOSURE

According to an aspect of the present disclosure, an assembly is provided for an aircraft. This aircraft assembly includes an airframe structure, a propulsion system and a vane. The airframe structure includes a fuselage and at least two wings. The fuselage extends longitudinally along a longitudinal centerline from a forward end of the fuselage to an aft end of the fuselage. The wings extend laterally from opposing sides of the fuselage. The propulsion system is mounted to the airframe structure. The propulsion system includes an airflow inlet into the propulsion system. The airflow inlet is spaced vertically out from a top side of the airframe structure. The vane projects vertically out from the top side of the airframe structure to a distal end of the vane. The vane laterally overlaps and is longitudinally forward of the airflow inlet.

According to another aspect of the present disclosure, another assembly is provided for an aircraft. This aircraft assembly includes an airframe structure, a propulsion system and a vane. The airframe structure is configured as or otherwise includes a fuselage. The fuselage extends longitudinally along a centerline from a forward end of the fuselage to an aft end of the fuselage. The propulsion system is mounted to a side of the airframe structure and is disposed outside of the fuselage. The propulsion system includes a propulsor rotor and a drive unit configured to drive rotation of the propulsor rotor about a rotational axis. The vane projects out from the side of the airframe structure to a distal end of the vane. The vane is disposed upstream of the propulsor rotor along the side of the airframe structure. The vane is aligned with the rotational axis.

According to still another aspect of the present disclosure, another assembly is provided for an aircraft. This aircraft assembly includes a blended wing aircraft body, a propulsion system and a vane. The blended wing aircraft body extends longitudinally along a centerline from a forward end of the blended wing aircraft body to an aft end of the blended wing aircraft body. The propulsion system is mounted to a side of the blended wing aircraft body. The vane projects out from the side of the blended wing aircraft body, into an external environment outside of the blended wing aircraft body, to a distal end of the vane. The vane laterally overlaps and is longitudinally upstream of the propulsion system.

The vane may be longitudinally next to the airflow inlet.

The vane may extend along a vane centerline from a leading edge of the vane to a trailing edge of the vane. The vane centerline may be parallel with the longitudinal centerline.

The vane may extend along a vane centerline from a leading edge of the vane to a trailing edge of the vane. The vane centerline may be angularly offset from the longitudinal centerline by a non-zero acute angle equal to or less than twenty degrees.

The vane may extend along a vane centerline from a leading edge of the vane to a trailing edge of the vane. A vertical height of a leading edge section of the vane at the leading edge may be greater than the vertical height of a trailing edge section of the vane at the trailing edge.

The vane may extend along a vane centerline from a leading edge of the vane to a trailing edge of the vane. A vertical height of a leading edge section of the vane at the leading edge may be less than the vertical height of a trailing edge section of the vane at the trailing edge.

The vane may extend along a vane centerline from a leading edge of the vane to a trailing edge of the vane. A vertical height of a leading edge section of the vane at the leading edge may be equal to the vertical height of a trailing edge section of the vane at the trailing edge.

The propulsion system may also include a duct and a propulsor rotor within the duct downstream of the airflow inlet.

The propulsor rotor may have a diameter. A length of the vane may extend from a leading edge of the vane to a trailing edge of the vane. A quotient of the length of the vane divided by the diameter may be between 0.4 and 2.1.

The propulsor rotor may have a diameter. A leading edge of the vane may be longitudinally spaced from an airflow inlet by a longitudinal distance. A quotient of the longitudinal distance divided by the diameter may be between 0.2 and 2.0.

The propulsor rotor may have a diameter. The propulsion system may be mounted to the airframe structure by a pylon. A leading edge of the vane may be longitudinally spaced from the pylon by a longitudinal distance. A quotient of the longitudinal distance divided by the diameter may be between 0.3 and 3.0.

The propulsor rotor may have a diameter. A quotient of a maximum vertical height of the vane divided by the diameter may be equal to or less than 1.0.

The airflow inlet may be spaced vertically out from the top side of the airframe structure by a vertical distance. A quotient of the vertical distance divided by a maximum vertical height of the vane may be between 0.25 and 40.

A length of the vane may extend from a leading edge of the vane to a trailing edge of the vane. A quotient of a maximum thickness of the vane divided by the length of the vane may be between 0.05 and 0.2.

A length of the vane may extend from a leading edge of the vane to a trailing edge of the vane. A point of a maximum thickness of the vane may be spaced from the leading edge of the vane by a distance. A quotient of the distance divided by the length of the vane may be between 0.05 and 0.40.

The aircraft may be a blended wing body aircraft. The airframe structure may be a structure of the blended wing body aircraft.

The propulsion system may be external to the airframe structure.

The propulsion system may be mounted to the airframe structure by a pylon. The pylon may project vertically out from the top side of the airframe structure to the propulsion system.

The propulsion system may be mounted to the fuselage. The vane may project vertically out from the fuselage.

The propulsion system may also include a ducted propulsor rotor downstream of the airflow inlet within the propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
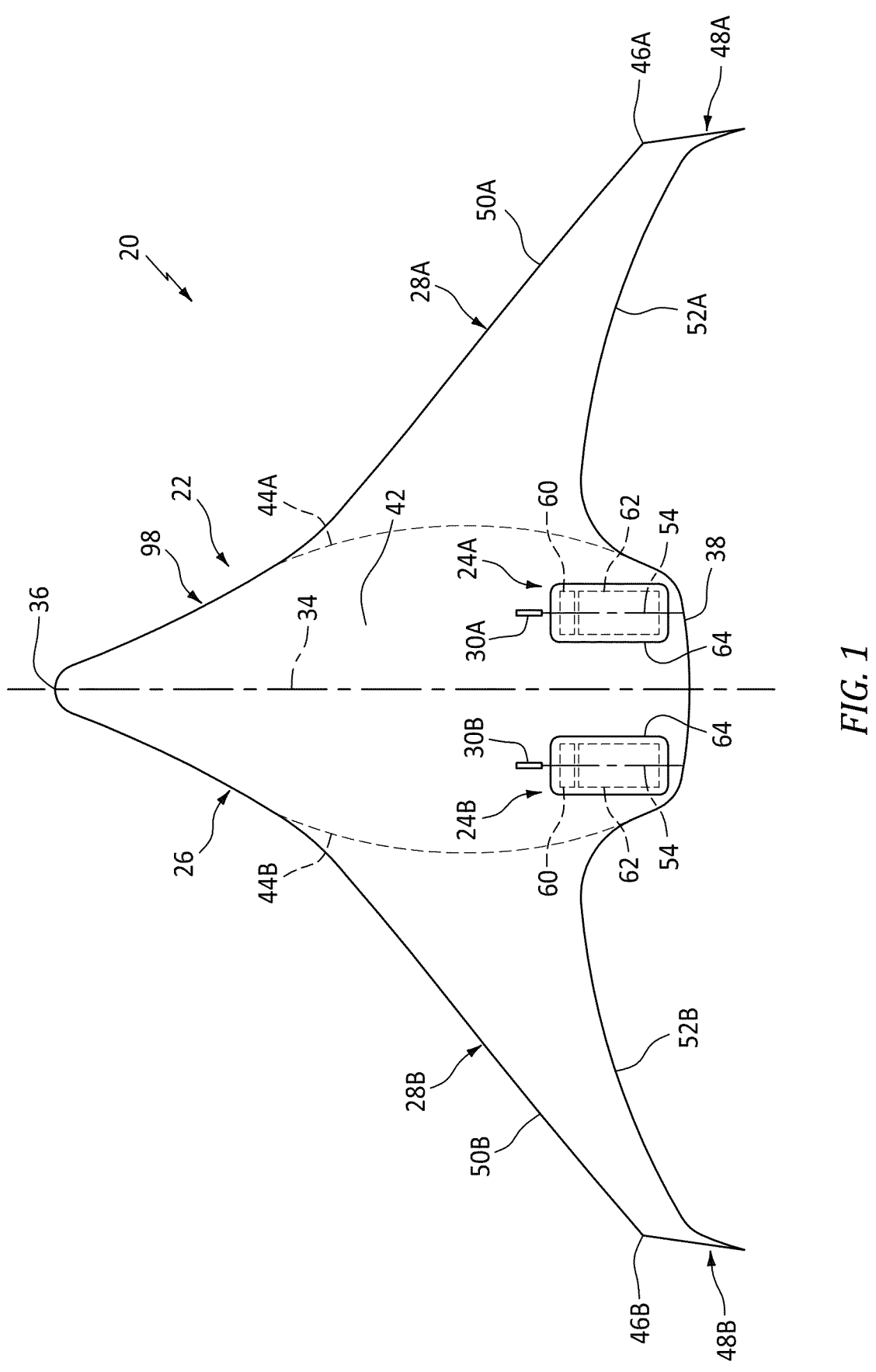
FIG. 1 is a plan view illustration of an aircraft.

FIG. 1 illustrates a blended wing body (BWB) aircraft 20. This BWB aircraft 20 includes an airframe 22 and one or more propulsion systems 24A and 24B (generally referred to as "24"). The aircraft airframe 22 includes a body 26 (e.g., a fuselage), one or more wings 28A and 28B (generally referred to as "28") and one or more stationary vertical inlet vanes 30A and 30B (generally referred to as "30"). For ease of description, each aircraft propulsion system 24 is described below as being arranged with a single one of the inlet vanes 30. However, it is contemplated each aircraft propulsion system 24 may alternatively be arranged with multiple of the inlet vanes 30 in other embodiments.

Figure 2:
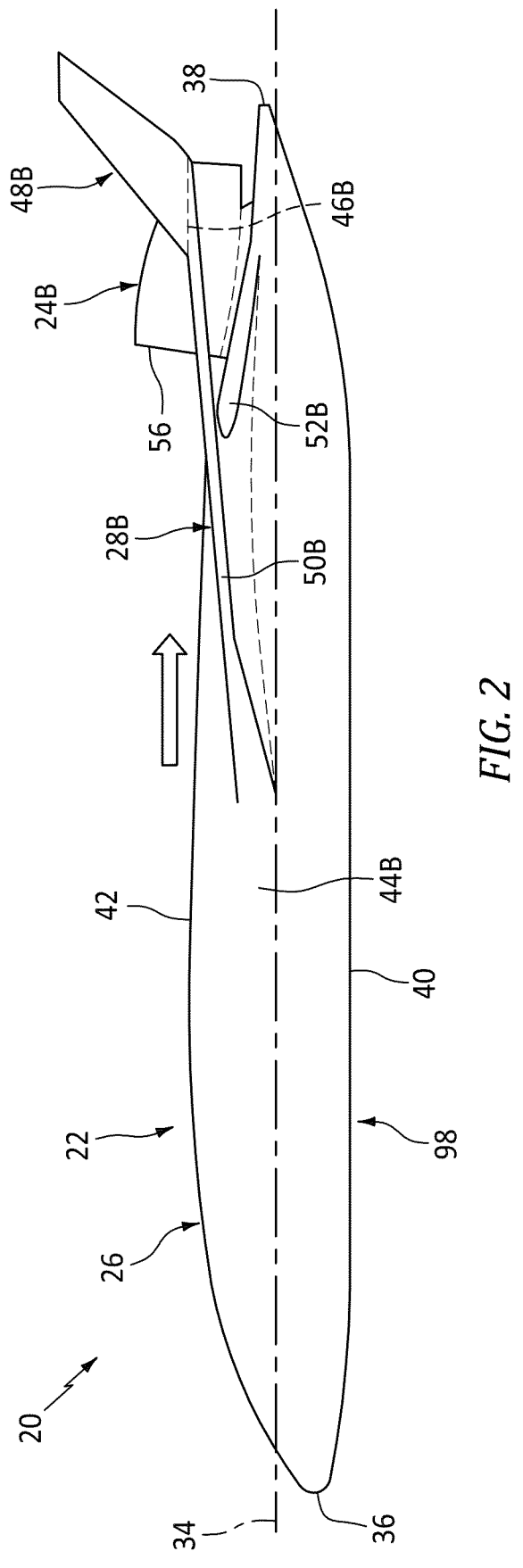
FIG. 2 is a side view illustration of the aircraft.
Figure 3:
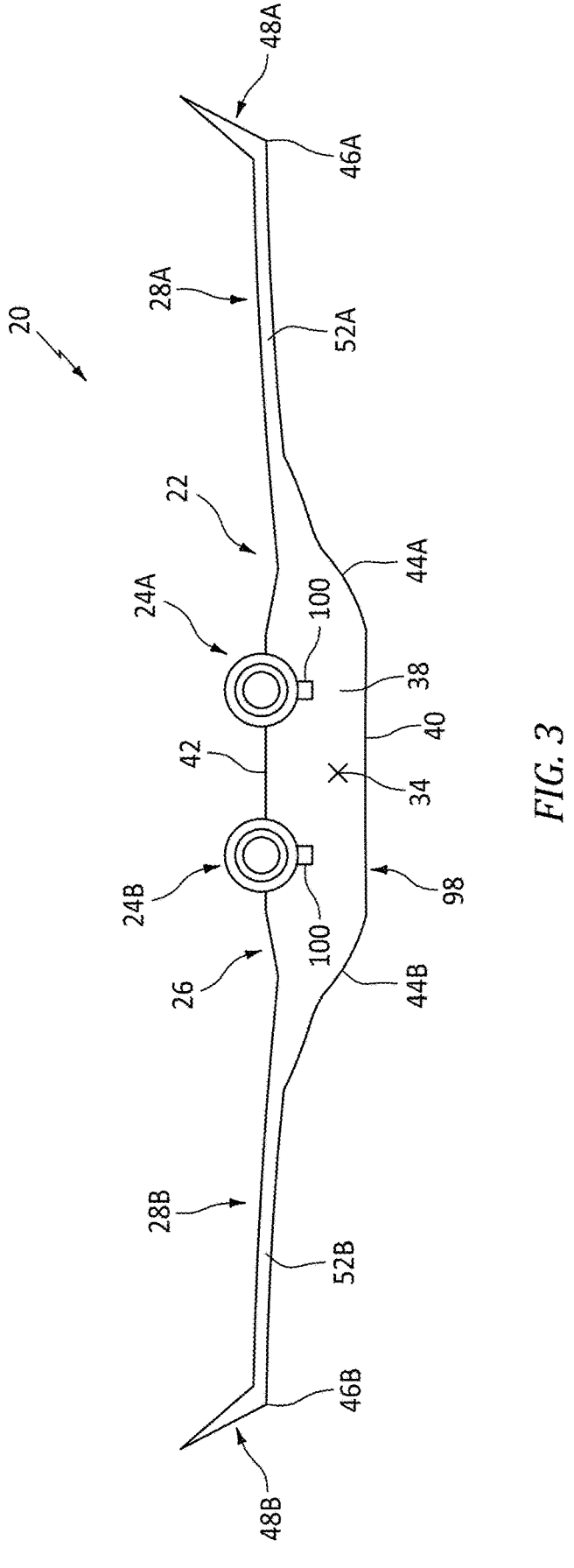
FIG. 3 is a rear end view illustration of the aircraft.

The aircraft body 26 of FIG. 1 extends longitudinally along a longitudinal centerline 34 between and to an upstream, forward end 36 (e.g., a tip end) of the aircraft body 26 and a downstream, aft end 38 (e.g., a tail end) of the aircraft body 26. This longitudinal centerline 34 may be a centerline axis of the BWB aircraft 20, the aircraft airframe 22 and/or the aircraft body 26. Referring to FIG. 2, the longitudinal centerline 34 may be substantially (e.g., within +/−five or ten degrees) or completely parallel with a horizon line when the BWB aircraft 20 is flying in level flight. The aircraft body 26 extends vertically between and to opposing vertical bottom and top sides 40 and 42 of the aircraft body 26. The body bottom side 40 is vertically below the body top side 42 with respect to a gravitational direction when the BWB aircraft 20 is flying in level flight. Referring to FIGS. 1 and 3, the aircraft body 26 extends laterally between and to opposing lateral sides 44A and 44B (generally referred to as "44") of the aircraft body 26.

The aircraft wings 28A and 28B of FIGS. 1 and 3 are arranged to the opposing lateral sides 44A and 44B of the aircraft body 26. Each of the aircraft wings 28 is connected to (e.g., fixed to) the aircraft body 26. Each of the aircraft wings 28 projects spanwise along a span line of the respective aircraft wing 28A, 28B out from the aircraft body 26, at the respective body lateral side 44A, 44B, to a distal tip 46A, 46B of the respective aircraft wing 28A, 28B. At the wing tip 46A, 46B, the respective aircraft wing 28A, 28B may (or may not) be configured with a winglet 48A, 48B. Each of the aircraft wings 28 of FIG. 1 extends longitudinally along a mean line of the respective aircraft wing 28A, 28B from a leading edge 50A, 50B of the respective aircraft wing 28A, 28B to a trailing edge 52A, 52B of the respective aircraft wing 28A, 28B. The wing leading edge 50A, 50B of FIG. 1, at a base of the respective aircraft wing 28A, 28B, is longitudinally spaced aft, downstream from the body forward end 36. The wing trailing edge 52A, 52B of FIG. 1, at the wing base, is longitudinally spaced forward, upstream from the body aft end 38. The present disclosure, however, is not limited to such an exemplary aircraft wing arrangement.

Figure 4:
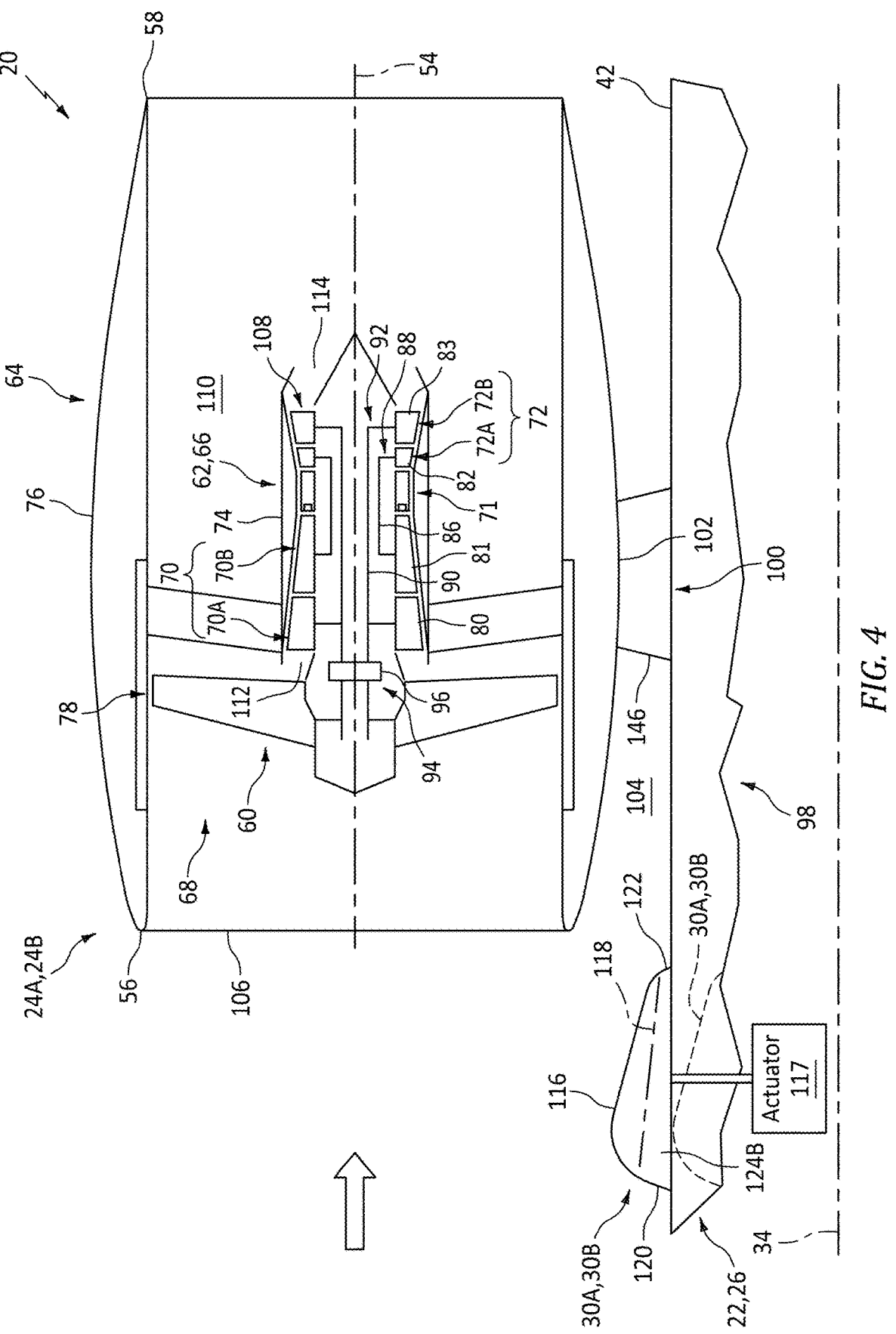
FIG. 4 is a schematic side sectional illustration of a propulsion system mounted to an airframe structure with an inlet vane.

Referring to FIG. 4, each aircraft propulsion system 24 extends axially along an axis 54 from an upstream, forward end 56 of the respective aircraft propulsion system 24 to a downstream, aft end 58 of the respective aircraft propulsion system 24. This axis 54 may be a centerline axis of the respective aircraft propulsion system 24 and/or one or more components of the respective aircraft propulsion system 24. The axis 54 may also or alternatively be a rotational axis of one or more components of the respective aircraft propulsion system 24.

Each aircraft propulsion system 24 includes a bladed propulsor rotor 60, a powerplant 62 and a propulsion system housing 64. For ease of description, the powerplant 62 is described below as a core 66 (e.g., a gas generator) of a turbine engine 68, where the turbine engine core 66 is configured to drive rotation of the propulsor rotor 60 of the turbine engine 68 about its axis 54. The present disclosure, however, is not limited to turbine engine aircraft propulsion systems. The powerplant 62, for example, may alternatively be configured as or otherwise include a rotary internal combustion (IC) engine, a hybrid-electric engine, an electric motor or another drive unit which is operable to drive the rotation of the propulsor rotor 60 about the axis 54. Moreover, for ease of description, the propulsor rotor 60 is described below as a ducted propulsor rotor; e.g., a fan rotor within a duct of the turbine engine 68. The propulsor rotor 60, however, may alternatively be configured as a partially ducted propulsor rotor or an open propulsor rotor (e.g., an un-ducted propulsor rotor) in other embodiments.

The powerplant 62 of FIG. 4 includes a compressor section 70, a combustor section 71 and a turbine section 72. The compressor section 70 of FIG. 4 includes a low pressure compressor (LPC) section 70A and a high pressure compressor (HPC) section 70B. The turbine section 72 of FIG. 4 includes a high pressure turbine (HPT) section 72A and a low pressure turbine (LPT) section 72B. These engine sections 70A-72B are housed within the propulsion system housing 64. The propulsion system housing 64 of FIG. 4, for example, includes a housing inner structure 74 and a housing outer structure 76. The housing inner structure 74 houses the turbine engine core 66 and its engine sections 70A-72B. The housing outer structure 76 houses a propulsor section 78 (e.g., a fan section) of the turbine engine 68, which propulsor section 78 includes the propulsor rotor 60. The housing outer structure 76 of FIG. 4 is also spaced radially outboard from, axially overlaps and may circumscribe the housing inner structure 74.

Each of the engine sections 70A-72B includes a respective bladed rotor 80-83. Each of these bladed rotors 80-83 as well as the propulsor rotor 60 includes a plurality of rotor blades arranged circumferentially around and connected to one or more respective rotor disks or hubs. The rotor blades, for example, may be formed integral with or mechanically fastened, welded, brazed and/or otherwise attached to the respective rotor disk(s) or hub(s).

The HPC rotor 81 is coupled to and rotatable with the HPT rotor 82. The HPC rotor 81 of FIG. 4, for example, is connected to the HPT rotor 82 through a high speed shaft 86. At least (or only) the HPC rotor 81, the HPT rotor 82 and the high speed shaft 86 may collectively form a high speed rotating assembly 88; e.g., a high speed spool of the turbine engine core 66. The high speed rotating assembly 88 of FIG. 4 and its members 81, 82 and 86 are configured to rotate about the axis 54.

The LPC rotor 80 is coupled to and rotatable with the LPT rotor 83. The LPC rotor 80 of FIG. 4, for example, is connected to the LPT rotor 83 through a low speed shaft 90. At least (or only) the LPC rotor 80, the LPT rotor 83 and the low speed shaft 90 may collectively form a low speed rotating assembly 92; e.g., a low speed spool of the turbine engine core 66. The low speed rotating assembly 92 of FIG. 4 and its members 80, 83 and 90 are configured to rotate about the axis 54. This low speed rotating assembly 92 is further coupled to the propulsor rotor 60 through a drivetrain 94. This drivetrain 94 may be configured as a geared drivetrain, where a geartrain 96 (e.g., a transmission, a speed change device, an epicyclic geartrain, etc.) is disposed between and operatively couples the propulsor rotor 60 to the low speed rotating assembly 92 and its LPT rotor 83. With this arrangement, the propulsor rotor 60 may rotate at a different (e.g., slower) rotational speed than the low speed rotating assembly 92 and its LPT rotor 83. Here, the propulsor rotor 60 and the low speed rotating assembly 92 may rotate in a common (the same) direction about the axis 54 or in opposite directions about the axis 54 depending, for example, upon the specific configuration of the geartrain 96. Alternatively, the drivetrain 94 may be configured as a direct drive drivetrain, where the geartrain 96 is omitted. With such an arrangement, the propulsor rotor 60 rotates at a common (the same) rotational speed as the low speed rotating assembly 92 and its LPT rotor 83.

Referring to FIG. 1, the aircraft propulsion systems 24 are arranged to opposing lateral sides of the longitudinal centerline 34 and, thus, a lateral center of the BWB aircraft 20 and its airframe 22. The first aircraft propulsion system 24A of FIG. 1, for example, is spaced laterally from the longitudinal centerline 34 by a lateral first distance. The second aircraft propulsion system 24B of FIG. 1 is spaced laterally from the longitudinal centerline 34 by a lateral second distance, which second distance may be equal to the first distance. The longitudinal centerline 34 may thereby be arranged laterally midway between the aircraft propulsion systems 24.

Each of the aircraft propulsion systems 24 is connected to a structure 98 of the airframe 22. This airframe structure 98 may include the aircraft body 26 and/or one or more of the aircraft wings 28. Each of the aircraft propulsion systems 24 may also be located external to (e.g., outside of) the airframe structure 98 and its members 26 and 28. Each aircraft propulsion system 24 of FIG. 4, for example, is disposed vertically above and is mounted (e.g., mechanically fixed) to the aircraft body 26 at (e.g., on, adjacent or proximate) the body top side 42 and, for example, the body aft end 38 (see FIG. 1). In particular, each aircraft propulsion system 24 of FIG. 4 is mounted to the aircraft body 26 by a pylon 100. This pylon 100 projects vertically out from the aircraft body 26 at the body top side 42 to a vertical bottom side 102 of the respective aircraft propulsion system 24 and its propulsion system housing 64. With this arrangement, each aircraft propulsion system 24 and its housing outer structure 76 are vertically spaced out from the airframe structure 98 and its aircraft body 26. A wing top surface flow gully 104 may thereby be formed by and extend vertically between the aircraft body 26 and the respective aircraft propulsion system 24 and its housing outer structure 76. The wing top surface flow gully 104 extends longitudinally along the respective aircraft propulsion system 24 from the propulsion system forward end 56 to the propulsion system aft end 58. The wing top surface flow gully 104 of FIG. 4 may thereby completely bypass (e.g., extend around and outside of) the respective aircraft propulsion system 24.

During propulsion system operation, ambient air from outside of the BWB aircraft 20 enters the respective aircraft propulsion system 24 and its turbine engine 68 through an airflow inlet 106. This air is directed across the propulsor section 78 and its propulsor rotor 60 and into a (e.g., annular) radial inner core flowpath 108 and a (e.g., annular) radial outer bypass flowpath 110. The core flowpath 108 of FIG. 4 extends sequentially through the LPC section 70A, the HPC section 70B, the combustor section 71, the HPT section 72A and the LPT section 72B from an airflow inlet 112 into the core flowpath 108 to a combustion products exhaust 114 out from the core flowpath 108 and the turbine engine core 66. The air entering the core flowpath 108 may be referred to as "core air". The bypass flowpath 110 extends through a bypass duct, which bypass duct bypasses (e.g., is disposed radially outboard of and extends along) the turbine engine core 66. The air within the bypass flowpath 110 may be referred to as "bypass air".

The core air is compressed by the LPC rotor 80 and the HPC rotor 81 and is directed into a (e.g., annular) combustion chamber of a (e.g., annular) combustor in the combustor section 71. Fuel is injected into the combustion chamber by one or more fuel injectors and mixed with the compressed core air to provide a fuel-air mixture. This fuel-air mixture is ignited and combustion products thereof flow through and sequentially drive rotation of the HPT rotor 82 and the LPT rotor 83 about the axis 54. The rotation of the HPT rotor 82 and the LPT rotor 83 respectively drive rotation of the HPC rotor 81 and the LPC rotor 80 about the axis 54 and, thus, compression of the air received from the core inlet 112. The rotation of the LPT rotor 83 also drives rotation of the propulsor rotor 60. The rotation of the propulsor rotor 60 propels the bypass air through and out of the bypass flowpath 110. The propulsion of the bypass air may account for a majority of thrust generated by the turbine engine 68 of FIG. 4, e.g., more than seventy-five percent (75%) of engine thrust. The turbine engine 68 of the present disclosure, however, is not limited to the foregoing exemplary thrust ratio.

During certain operating conditions, boundary layer air flowing in a downstream, aft direction along the body top side 42 (e.g., a top vertical side of the airframe structure 98) may trip upstream of a respective aircraft propulsion system 24. This tripped boundary layer air may generate vortices within the ambient air entering the respective aircraft propulsion system 24 through its airflow inlet 106. Examples of the operating conditions include, but are not limited to, slow forward aircraft movement, slow airspeed along the body top side 42, while the BWB aircraft 20 is stationary or taxiing on ground, etc. To reduce or prevent formation of such vortices, the inlet vane 30 is arranged at least partially (or completely) upstream of a respective one of the aircraft propulsion systems 24 to modify a tripping point of the boundary layer air. Each inlet vane 30, for example, may be arranged such that vortices generated by the tripped air are directed into the respective wing top surface flow gully 104 vertically below the respective aircraft propulsion system 24 and its airflow inlet 106.

In some examples, the inlet vane 30 of FIG. 4 may be connected (e.g., fixed) to the airframe structure 98. In such examples, the inlet vane 30 of FIG. 4, for example, may project vertically (e.g., spanwise) out from the aircraft body 26 at the body top side 42 to a vertical distal end 116 (e.g., an unsupported vertical tip) of the respective inlet vane 30. In some examples, the inlet vane 30 may be retractable into and/or otherwise moveable mounted with the airframe structure 98. In such examples, the inlet vane 30 may be configured to extend to an extended position, such as that illustrated in FIG. 4, and retract in a retracted position within the airframe structure 98 in a retracted position (see dashed line inlet vane 30). In FIG. 4, the inlet vane 30 is moved (e.g., extended and retracted) using an actuator system with at least one actuator 117. In the retracted position, the airframe structure 98 may be flush such that flow over the surface (e.g., at the body top side 42) may be substantially (e.g., mostly) laminar. In some examples, the airframe structure 98 may be configured with a door that is configured to open for extension of the inlet vane 30 and close when the inlet vane 30 is in a retracted position. The retraction and/or extension of the inlet vane 30 may be enabled by use of a motor or other mechanical mechanism. In some examples, the inlet vane 30 may be configured to be held in the extended and/or the retracted position by a locking mechanism. In some examples, the inlet vane 30 may be configured to be retracted and/or extended by an operator (e.g., pilot, remote operator, etc.), such as by a switch or other mechanism on an operation console. In some examples, an engine controller (e.g., full authority digital engine controller, electronic engine controller, etc.) may be configured to extend and/or retract the inlet vane 30 based on operating conditions (e.g., aircraft speed, runway direction, wind direction and magnitude, precipitation, etc.) in an environment of the aircraft 20. For example, the inlet vane 30 may be configured to be retracted manually or automatically (e.g., by the controller and without human input) based on a detected crosswind component (e.g., magnitude of wind perpendicular to the aircraft direction of travel) being above a threshold magnitude.

Figure 5:
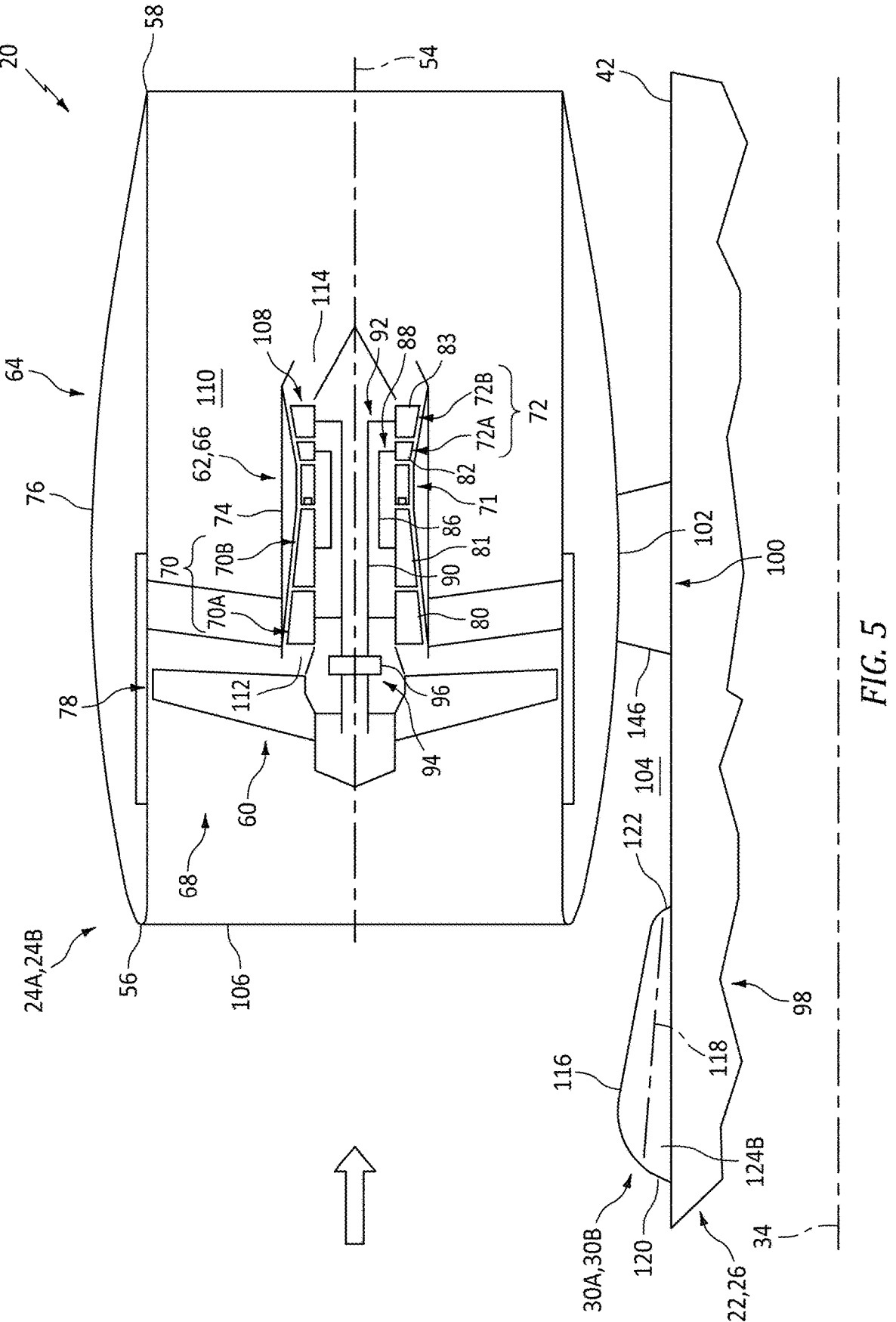
FIG. 5 is a schematic side sectional illustration of the propulsion system mounted to the airframe structure with another inlet vane.
Figure 6:
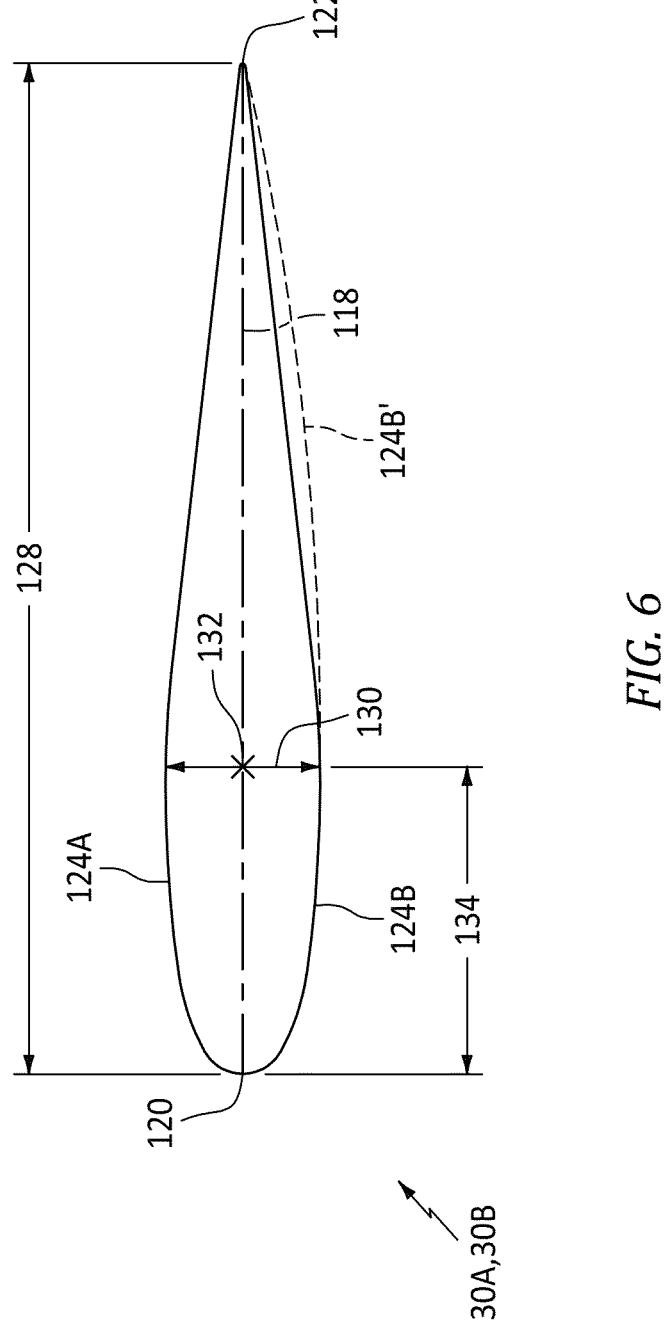
FIG. 6 is an illustration of the inlet vane.

Each inlet vane 30 extends along a centerline 118 (e.g., a mean line such as a chord line where the inlet vane 30 is symmetrical) of the respective inlet vane 30 from a leading edge 120 of the respective inlet vane 30 to a trailing edge 122 of the respective inlet vane 30. The vane leading edge 120 of FIG. 4 is located longitudinally forward and upstream of the respective aircraft propulsion system 24 and its elements 56, 106 along the longitudinal centerline 34. The vane trailing edge 122 of FIG. 4 is also located longitudinally forward and upstream of the respective aircraft propulsion system 24 and its elements 56, 106 along the longitudinal centerline 34. An entirety of the inlet vane 30 of FIG. 4 is thereby located forward and upstream of the respective aircraft propulsion system 24 and its elements 56, 106. Here, the inlet vane 30 and its vane trailing edge 122 of FIG. 4 are next to (e.g., longitudinally adjacent) the respective aircraft propulsion system 24 and its elements 56, 106. In other embodiments, referring to FIG. 5, the vane trailing edge 122 may alternatively be located aft and downstream of the propulsion system elements 56, 106. A downstream, aft end portion of the inlet vane 30 of FIG. 5 thereby longitudinally overlaps the respective aircraft propulsion system 24 and its elements 56, 106. Referring to FIG. 6, each inlet vane 30 extends laterally between opposing lateral (e.g., convex) sides 124A and 124B (generally referred to as "124") of the respective inlet vane 30. The vane sides 124 extend along the vane centerline 118 between and meet at the vane leading edge 120 and the vane trailing edge 122. Referring to FIG. 4, each of the vane 120, 122 and 124 elements projects vertically out from body top side 42 to the vane distal end 116. Here, each inlet vane 30 of FIG. 4 is configured as an airfoil.

Figure 7:
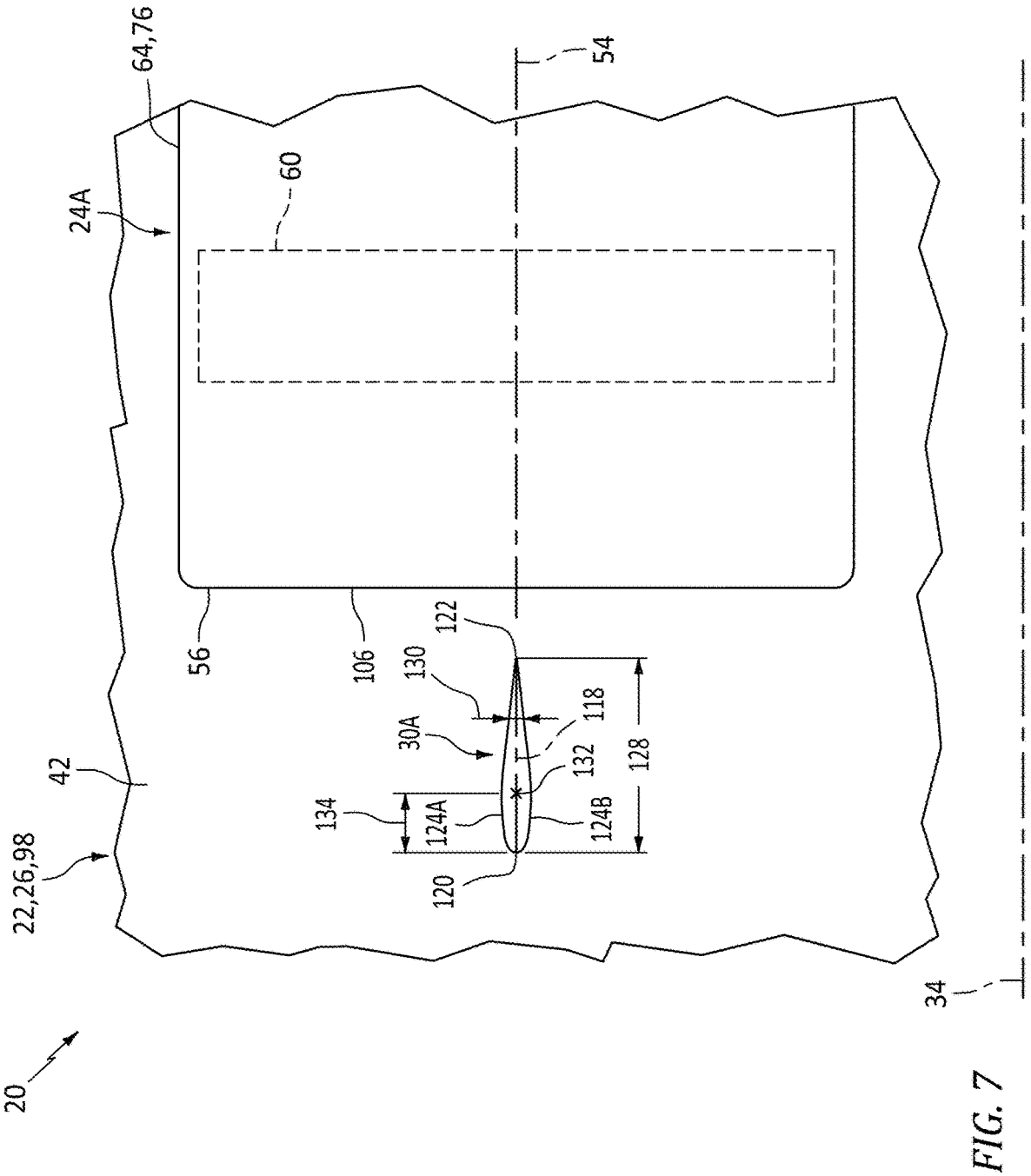
FIGS. 7-9 are schematic plan view illustrations of a portion of the aircraft at an upstream, forward end of the propulsion system with the inlet vane in various orientations.
Figure 8:
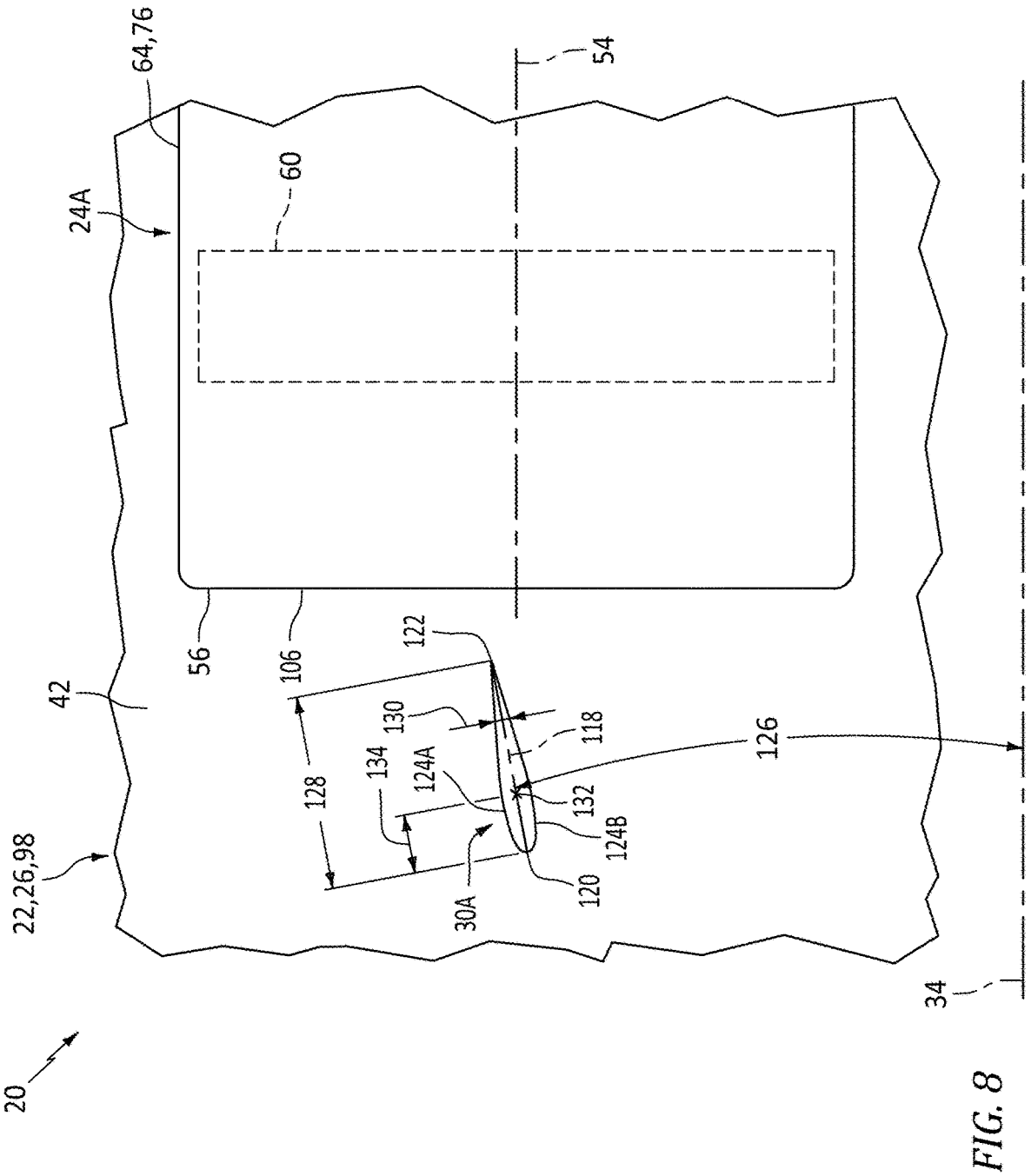
Figure 9:
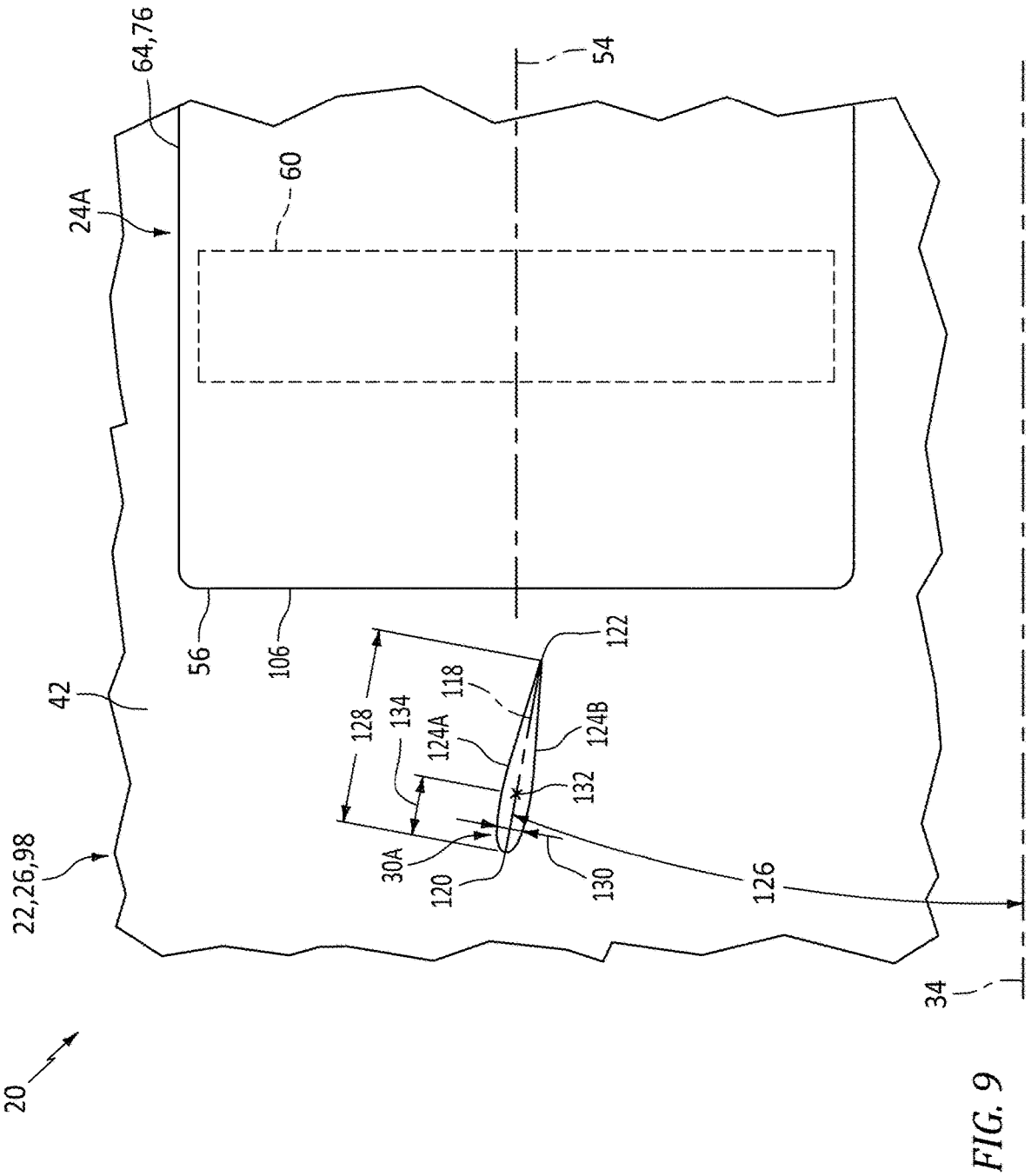
Figure 13B:
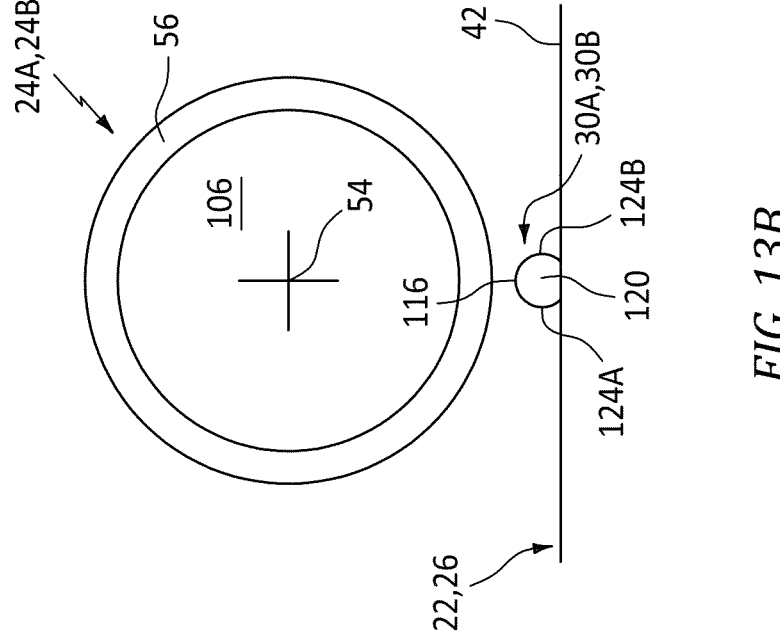
FIGS. 13A and 13B are schematic front end view illustrations of a portion of the aircraft with various inlet vane arrangements.
Figure 13A:
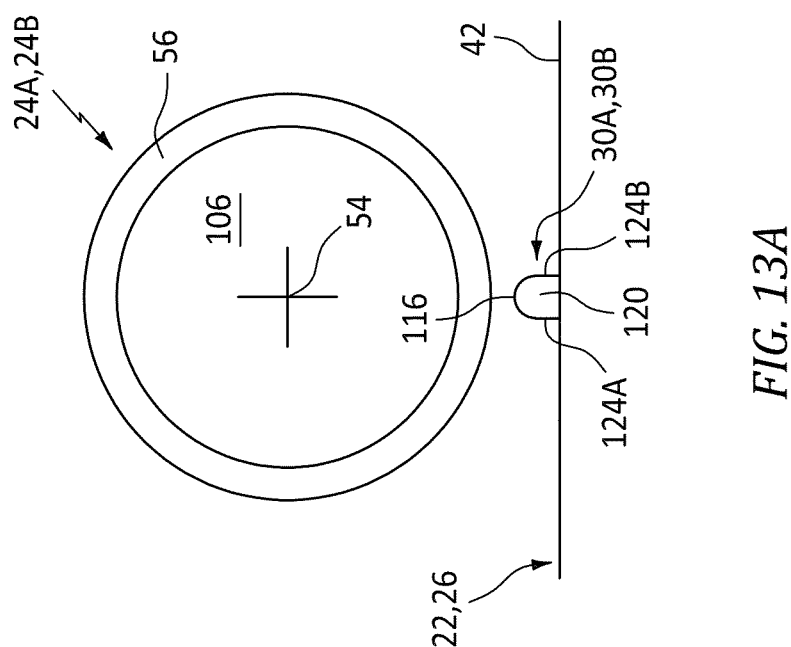

Referring to FIG. 7, each inlet vane 30 (inlet vane 30A shown for ease of illustration) is laterally aligned with and laterally overlaps the respective aircraft propulsion system 24 and its airflow inlet 106; see also FIGS. 13A and 13B. Each inlet vane 30, for example, may be laterally centered relative to the respective aircraft propulsion system 24 and its airflow inlet 106. In FIG. 7, the vane centerline 118 is laterally aligned with and parallel to the longitudinal centerline 34 and/or the axis 54 of the respective aircraft propulsion system 24 when viewed, for example, in a first reference plane; e.g., a plane parallel to the body top side 42 at the respective inlet vane 30. While the vane centerline 118 is shown as being parallel to the longitudinal centerline 34 and/or the respective propulsion system axis 54 in FIG. 7, the present disclosure is not limited to such an exemplary arrangement. For example, referring to FIGS. 8 and 9, the vane centerline 118 may alternatively be angularly offset from the longitudinal centerline 34 and/or the respective propulsion system axis 54 by a non-zero acute offset angle 126 when viewed, for example, in the first reference plane. This offset angle 126 may be equal to or less than twenty degrees (20°). In FIG. 8, the vane leading edge 120 is positioned laterally closer to the longitudinal centerline 34 than the vane trailing edge 122. The inlet vane 30 of FIG. 8 is thereby pitched towards the longitudinal centerline 34. In FIG. 9, the vane leading edge 120 is positioned laterally farther away from the longitudinal centerline 34 than the vane trailing edge 122. The inlet vane 30 of FIG. 8 is thereby pitched away from the longitudinal centerline 34. In some examples, the inlet vane 30 may be configured to move between a first position illustrated in FIG. 7, a second position illustrated in FIG. 8, a third position illustrated in FIG. 9, and/or another position located between the first position and the second and/or third positions. In such examples, the inlet vane 30 may be coupled to a mechanism configured to adjust a position of the inlet vane 30. In some examples, the mechanism may be the same as or different than the mechanism that enables extension and/or retraction of the inlet vane 30, such as that described above with respect to FIG. 4. In such examples, the inlet vane 30 may be configured to retract and extend into an extended position and, when in the extended position, a controller may adjust the offset angle 126 of the inlet vane 30.

Referring to FIGS. 7-9, each inlet vane 30 has a length 128 extending along its vane centerline 118 from its vane leading edge 120 to its vane trailing edge 122. Each inlet vane 30 also has a lateral thickness 130 extending laterally between its opposing vane sides 124. A maximum value of this vane thickness 130 (e.g., a maximum vane thickness) may occur at a point 132 along the vane centerline 118 between the vane leading edge 120 and the vane trailing edge 122. Here, the maximum thickness point 132 is spaced from the vane leading edge 120 along the vane centerline 118 by a distance 134, which leading edge-point distance 134 may be less than a distance along the vane centerline 118 between the maximum thickness point 132 and the vane trailing edge 122. At the maximum thickness point 132, each inlet vane 30 may be sized such that a quotient of the vane thickness 130 divided by the vane length 128 is between 0.05 and 0.2 (inclusive); e.g., the maximum vane thickness/ the vane length=between 0.05 and 0.2. Each inlet vane 30 may also be sized such that a quotient of the leading edge-point distance 134 divided by the vane length 128 is between 0.05 and 0.40 (inclusive); e.g., the leading edge-point distance/the vane length=between 0.10 and 0.30.

Figure 10:
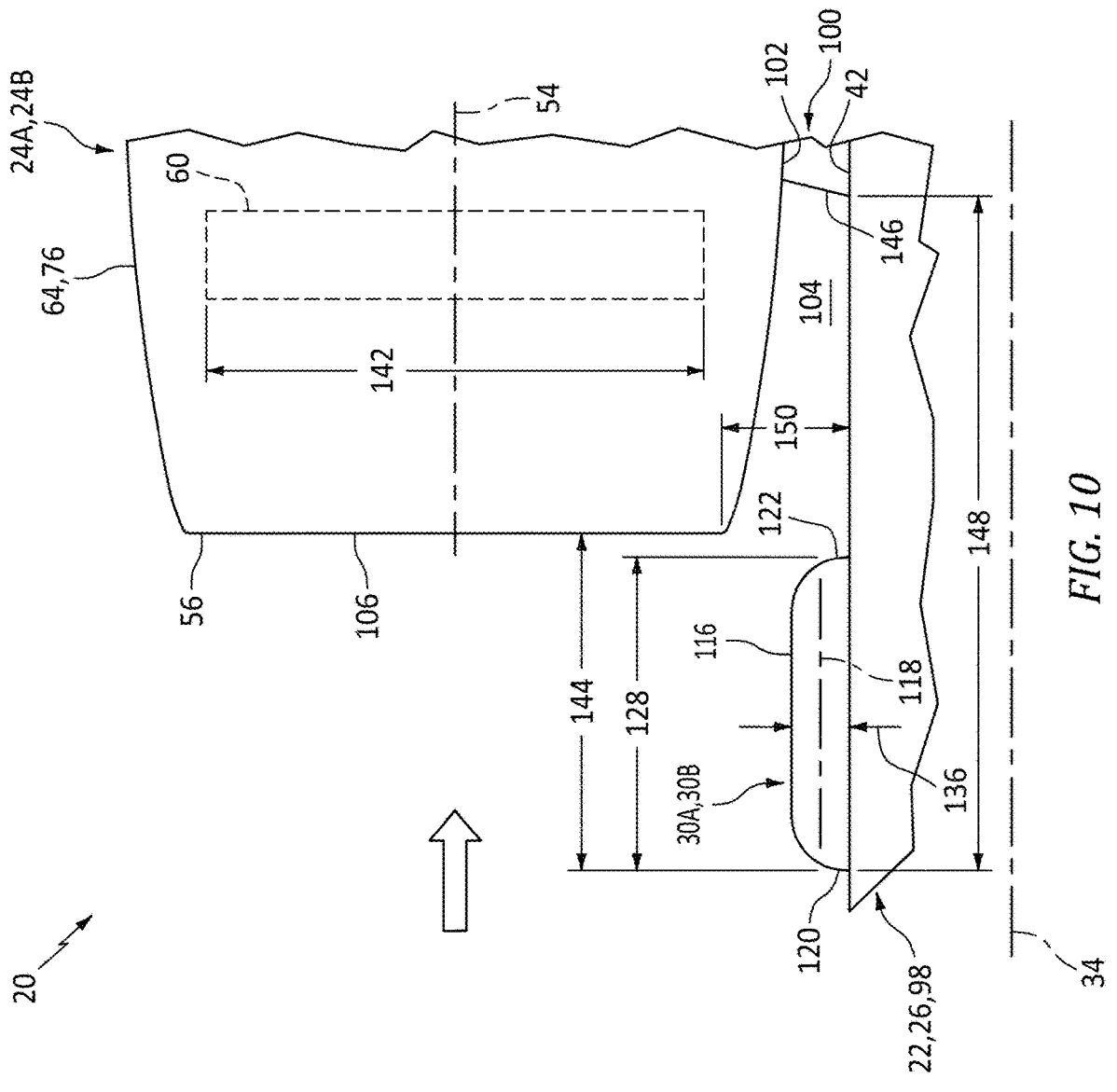
FIGS. 10-12 are schematic side illustrations of the propulsion system mounted to the airframe structure with various inlet vane arrangements.
Figure 11:
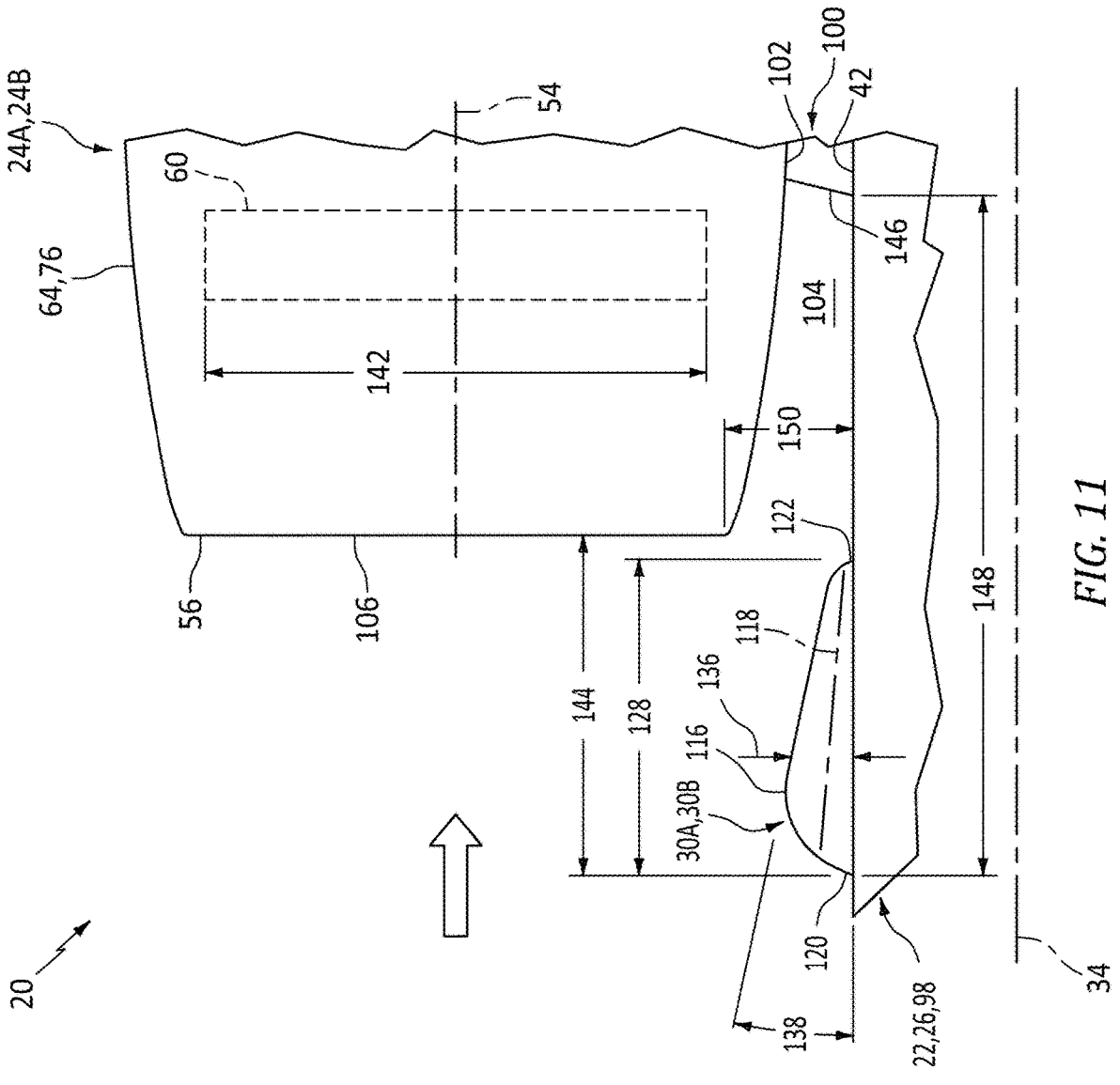
Figure 12:
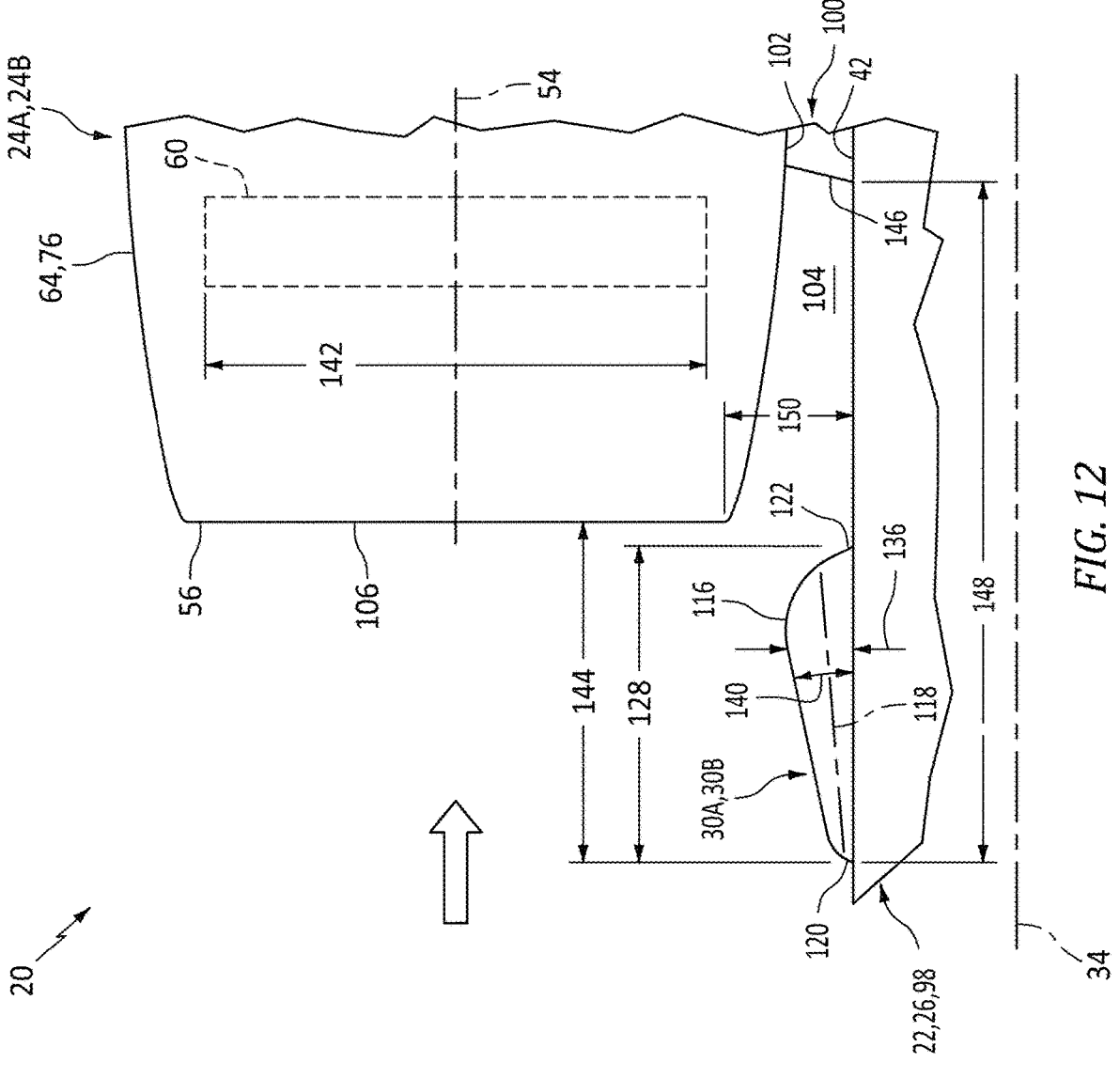

Referring to FIGS. 10-12, each inlet vane 30 has a vertical height 136 extending spanwise out from the body top side 42 to the vane distal end 116. Referring to FIG. 10, the vane height 136 at or about the vane leading edge 120 may be equal to the vane height 136 at or about the vane trailing edge 122. At least a major portion or an entirety of the vane distal end 116 may thereby be parallel to the body top side 42 when viewed, for example, in a second reference plane perpendicular to the body top side 42 at the respective inlet vane 30. Referring to FIG. 11, the vane height 136 at or about the vane leading edge 120 may alternatively be greater than the vane height 136 at or about the vane trailing edge 122. At least a major portion or the entirety of the vane distal end 116 may thereby be angularly offset from the body top side 42 by an offset angle 138 when viewed, for example, in the second reference plane. The offset angle 138 of FIG. 11 is a non-zero acute angle equal to or less than sixty degrees (60°). Referring to FIG. 12, the vane height 136 at or about the vane leading edge 120 may alternatively be less than the vane height 136 at or about the vane trailing edge 122. At least a major portion or the entirety of the vane distal end 116 may thereby be angularly offset from the body top side 42 by an offset angle 140 when viewed, for example, in the second reference plane. The offset angle 140 of FIG. 12 is a non-zero acute angle equal to or less than forty-five degrees (45°).

Referring to FIGS. 10-12, the propulsor rotor 60 has an outer diameter 142. Each inlet vane 30 may be arranged such that a quotient of the vane length 128 divided by the propulsor diameter 142 is between 0.4 and 2.1 (inclusive); e.g., the vane length/the propulsor diameter=between 0.4 and 2.1. The vane leading edge 120 is longitudinally spaced from the propulsion system forward end 56/the airflow inlet 106 along the longitudinal centerline 34 by a longitudinal distance 144. Each inlet vane 30 may be arranged such that a quotient of the vane leading edge-inlet distance 144 divided by the propulsor diameter 142 is between 0.20 and 2.0 (inclusive); e.g., the vane leading edge-inlet distance/the propulsor diameter=between 0.20 and 2.0, or more specifically between 0.4 and 1.5. The vane leading edge 120 is longitudinally spaced from a leading edge 146 of the pylon 100 along the longitudinal centerline 34 by a longitudinal distance 148. Each inlet vane 30 may be arranged such that a quotient of the vane leading edge-pylon distance 148 divided by the propulsor diameter 142 is between 0.3 and 3.0 (inclusive); e.g., the vane leading edge-pylon distance/the propulsor diameter=between 0.3 and 3.0. Each inlet vane 30 may be sized such that a quotient of a maximum value of the vane height 136 (e.g., the maximum vane height) divided by the propulsor diameter 142 is equal to or less than 1.0; e.g., the maximum vane height/the propulsor diameter ≤1.0. In addition, the airflow inlet 106 may be spaced vertically out from the body top side 42 by a vertical distance 150. The inlet vane 30 and the airflow inlet 106 may be arranged such that a quotient of the inlet distance 150 divided by the maximum value of the vane height 136 is between 0.25 and 40 (inclusive); e.g., the inlet distance/the maximum vane height=between 0.25 and 40, or more specifically between 1.0 and 20.

In some embodiments, referring to FIG. 6, each inlet vane 30 may be symmetric. The geometry of the vane sides 124A and 124B may be identical. In other embodiments, each inlet vane 30 may be asymmetric. The geometry of the vane side 124A, for example, may be different than the geometry of the vane side 124B'.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:

an airframe structure including a fuselage and at least two wings, the fuselage extending longitudinally along a longitudinal centerline from a forward end of the fuselage to an aft end of the fuselage, and the at least two wings extending laterally from opposing sides of the fuselage;

a propulsion system mounted to the airframe structure, the propulsion system including an airflow inlet into the propulsion system, and the airflow inlet spaced vertically out from a top side of the airframe structure; and a vane projecting vertically out from the top side of the airframe structure to a distal end of the vane, the vane laterally overlapping and longitudinally forward of the airflow inlet, wherein the propulsion system further includes a duct and a propulsor rotor within the duct downstream of the airflow inlet;

wherein the propulsor rotor has a diameter;

wherein a length of the vane extends from a leading edge of the vane to a trailing edge of the vane; and wherein a quotient of the length of the vane divided by the diameter is between 0.4 and 2.1.

2. The assembly of claim 1, wherein the vane is longitudinally next to the airflow inlet.

3. The assembly of claim 1, wherein the vane extends along a vane centerline from a leading edge of the vane to a trailing edge of the vane; and the vane centerline is parallel with the longitudinal centerline.

4. The assembly of claim 1, wherein the vane extends along a vane centerline from a leading edge of the vane to a trailing edge of the vane; and the vane centerline is angularly offset from the longitudinal centerline by a non-zero acute angle equal to or less than twenty degrees.

5. The assembly of claim 1, wherein the vane extends along a vane centerline from a leading edge of the vane to a trailing edge of the vane; and a vertical height of a leading edge section of the vane at the leading edge is greater than the vertical height of a trailing edge section of the vane at the trailing edge.

6. The assembly of claim 1, wherein the vane extends along a vane centerline from a leading edge of the vane to a trailing edge of the vane; and a vertical height of a leading edge section of the vane at the leading edge is less than the vertical height of a trailing edge section of the vane at the trailing edge.

7. The assembly of claim 1, wherein the vane extends along a vane centerline from the leading edge of the vane to the trailing edge of the vane; and a vertical height of a leading edge section of the vane at the leading edge is equal to the vertical height of a trailing edge section of the vane at the trailing edge.

8. The assembly of claim 1, wherein the leading edge of the vane is longitudinally spaced from the airflow inlet by a longitudinal distance; and a quotient of the longitudinal distance divided by the diameter is between 0.2 and 2.0.

9. The assembly of claim 1, wherein the propulsion system is mounted to the airframe structure by a pylon;

the leading edge of the vane is longitudinally spaced from the pylon by a longitudinal distance; and a quotient of the longitudinal distance divided by the diameter is between 0.3 and 3.0.

10. The assembly of claim 1, wherein a quotient of a maximum vertical height of the vane divided by the diameter is equal to or less than 1.0.

11. An assembly for an aircraft, comprising:

an airframe structure including a fuselage and at least two wings, the fuselage extending longitudinally along a longitudinal centerline from a forward end of the fuselage to an aft end of the fuselage, and the at least two wings extending laterally from opposing sides of the fuselage;

a propulsion system mounted to the airframe structure, the propulsion system including an airflow inlet into the propulsion system, and the airflow inlet spaced vertically out from a top side of the airframe structure; and a vane projecting vertically out from the top side of the airframe structure to a distal end of the vane, the vane laterally overlapping and longitudinally forward of the airflow inlet;

wherein the airflow inlet is spaced vertically out from the top side of the airframe structure by a vertical distance; and wherein a quotient of the vertical distance divided by a maximum vertical height of the vane is between 0.25 and 40.

12. An assembly for an aircraft, comprising:

an airframe structure including a fuselage and at least two wings, the fuselage extending longitudinally along a longitudinal centerline from a forward end of the fuselage to an aft end of the fuselage, and the at least two wings extending laterally from opposing sides of the fuselage;

a propulsion system mounted to the airframe structure, the propulsion system including an airflow inlet into the propulsion system, and the airflow inlet spaced vertically out from a top side of the airframe structure; and a vane projecting vertically out from the top side of the airframe structure to a distal end of the vane, the vane laterally overlapping and longitudinally forward of the airflow inlet;

wherein a length of the vane extends from a leading edge of the vane to a trailing edge of the vane; and wherein a quotient of a maximum thickness of the vane divided by the length of the vane is between 0.05 and 0.2.

13. The assembly of claim 1, wherein a point of a maximum thickness of the vane is spaced from the leading edge of the vane by a distance; and a quotient of the distance divided by the length of the vane is between 0.05 and 0.40.

14. The assembly of claim 1, wherein the aircraft is a blended wing body aircraft; and the airframe structure is a structure of the blended wing body aircraft.

15. The assembly of claim 1, wherein the propulsion system is external to the airframe structure.

16. The assembly of claim 1, wherein the propulsion system is mounted to the airframe structure by a pylon; and the pylon projects vertically out from the top side of the airframe structure to the propulsion system.

* * * * *